United States Patent [19]

Smith

[11] Patent Number: 5,144,465
[45] Date of Patent: Sep. 1, 1992

[54] SWITCHED OPTICAL NETWORK
[75] Inventor: David W. Smith, Woodbridge, England
[73] Assignee: British Telecommunications public limited company, London, England
[21] Appl. No.: 378,208
[22] PCT Filed: Nov. 18, 1988
[86] PCT No.: PCT/GB88/01019
  § 371 Date: Jul. 5, 1989
  § 102(e) Date: Jul. 5, 1989
[87] PCT Pub. No.: WO89/05085
  PCT Pub. Date: Jun. 1, 1989
[30] Foreign Application Priority Data
  Nov. 20, 1987 [GB] United Kingdom ................ 8727260
[51] Int. Cl.$^5$ ............................................. H04J 14/00
[52] U.S. Cl. .................................... 359/117; 359/128
[58] Field of Search ................... 370/1, 3, 4; 455/600; 359/109, 117, 124, 128, 133, 139

[56] References Cited

U.S. PATENT DOCUMENTS

| | | | |
|---|---|---|---|
| 3,755,676 | 8/1973 | Kinsel ..................... | 370/1 |
| 3,920,983 | 11/1975 | Schlafer et al. ........... | 370/3 |
| 4,365,863 | 12/1982 | Broussaud ................ | 370/1 |
| 4,467,468 | 8/1984 | Miller ..................... | 370/4 |
| 4,642,804 | 2/1987 | Personick ................. | 370/3 |
| 4,658,394 | 4/1987 | Cheng et al. .............. | 370/3 |
| 4,783,850 | 11/1988 | MacDonald et al. .......... | 455/617 |
| 4,837,855 | 6/1989 | Hajikano et al. .......... | 370/1 |
| 4,841,519 | 6/1989 | Nishio ..................... | 370/3 |
| 4,845,703 | 7/1989 | Suzuki ..................... | 370/1 |
| 4,894,818 | 1/1990 | Fujioka et al. ............ | 370/3 |
| 4,897,830 | 1/1990 | Hill et al. ................ | 370/3 |

FOREIGN PATENT DOCUMENTS

| | | | |
|---|---|---|---|
| 0223258 | 5/1987 | European Pat. Off. | |
| 0237793 | 11/1985 | Japan ..................... | 370/3 |

OTHER PUBLICATIONS

Article from Optical Fiber Communication Conference and Sixth International Conference on Integrated Optics and Optical Fiber Communication Technical Digest, 19-22 Jan. 1987, Reno, Nevada, Optical Society of America, (Washington, D.C., U.S.); S. Suzuki et al.: "Thirty-Two-Line Optical Space-Division Switching System", p. 146.

Abstract of Japan, vol. 8, No. 39 (E-228) (1476), 21 Feb. 1984 and JP, A, 58196796 (Nippon Denki K.K.) 16 Nov. 1983.

Abstracts of Japan, vol. 11, No. 152 (E-507) (2599), 16 May 1987, and JP, A, 61288593 (Nippon Telegr. & Teleph. Corp.) 18 Dec. 1986.

IEEE Communications Magazine, vol. 24, No. 5, May 1986, IEEE, (New York, US), S. F. Su et al.: "A Review on Classification of Optical Switching Systems", pp. 50-55.

Kobrinski, "Cross Connection of Wavelength-Division-Multiplexed High Speed Channels", *Electronics Letters*, 27 Aug. 1987, vol. 23, No. 18, pp. 974-976.

Japanese Abstract vol. 19, No. 95 (JP 59-94014) Broad Band Channel, Nippon Denki K.K.

*Primary Examiner*—Edward L. Coles, Sr.
*Assistant Examiner*—Kinfe-Michael Negash
*Attorney, Agent, or Firm*—Nixon & Vanderhye

[57]  ABSTRACT

Signals from transmitter stations are connected to receiver stations by a switched optical network. To provide a readily expandable, non-blocking network for a large network, groups of transmitter signals are formed into distinct optical wavelength multiplexes each of which is coupled by an optical fibre bus (4) to one input of each of several optical space switches (SW). Each receiver station is connected to an optical heterodyne receiver optically coupled to an output of one of the optical switches (SW). The required signal from the multiplex switched to an optical receiver is demultiplexed by combining with the multiplex an optical source (O) which has been frequency shifted by a frequency shifter (12). This is achieved by means of a secondary optical space switch (SW') and an optical combiner (14). The optical space switches (SW, SW') are controlled by a controller (6) to effect the desired connection.

50 Claims, 5 Drawing Sheets 5,144,465

SWITCHED OPTICAL NETWORK

FIELD OF THE INVENTION

This invention relates to a switched optical network for connecting signals from any one of a plurality of transmitter stations with any one of a plurality of receiver stations. It is of particular, but not exclusive, application to telecommunications networks.

BACKGROUND AND SUMMARY OF THE INVENTION

It is generally desirable to have a switched network which is non-blocking for connecting transmitter stations with receiver stations, that is, one in which any transmitter station can be connected to any free receiver station at any time.

A space switching circuit employing a single stage of crosspoints requires a number of switches equal to the product of the number of transmitter stations, T, and receiver stations, R. This arrangement becomes increasingly impracticable as the number of stations increases because of the need to incorporate a rapidly increasing number of switches. One approach to solving this problem is to use a multistage switching network which can be made non-blocking for a given number of stations by means of specific interconnections. Although this approach reduces the number of switches needed from the T and R product, disadvantages of this approach are that it is not easily expandable and the control system needed to control the switches is increasingly complex. As a second approach, if only a few extra stations are to be added to such a network, a number of additional switches can be added and kept to a minimum only at the expense of redesigning and reconfiguring the interconnections between switches. If this latter approach is to be avoided the existing stages of the multistage circuit must essentially be duplicated, thus requiring some design for add-on stages, which while reducing the redesign necessary, has more switching capacity than may be required.

Another method of providing a non-blocking switched network is to multiplex the signals from the transmitter stations and broadcast the multiplexed signals to the receiver stations and demultiplex the required channel. Various multiplexing schemes have been employed, for example pulse position coding, time domain multiplexing and frequency or wavelength multiplexing. Wavelength multiplexing in optical networks has been recognized as providing, in principle, the means of multiplexing many thousands of optical signals but in practice there are severe obstacles to be overcome in providing an optical network employing a multiplexing of such a large number of frequencies. In an optical fibre network the wavelengths need to be closely spaced to fall within the useable wavelength window of the fibre and the optical sources of the many wavelengths have to be extremely accurately tuned. Similarly the optical detectors of the receivers need to be very accurately tunable to receive only one wavelength with minimum crosstalk from adjacent wavelengths.

It is an object of the present invention to provide a switched optical network which can handle large numbers of signal channels more readily than hitherto possible. It is a further object of the present invention to provide a switched optical network that can be readily expanded to accomodate a relative few extra stations.

Accordingly there is provided a switched optical network for connecting signals from any one of a plurality of transmitter stations with any one of a plurality of receiver stations comprising:

at least two optical multiplexing means each responsive to signals from two or more transmitter stations to provide optical multiplexing corresponding to the transmitter station signals;

a plurality of demultiplexing means each responsive to optical multiplexing and a selection signal to output one transmitter station signal to the corresponding receiver station; and an optical switch means responsive to switch signals to optically couple any one of the optical multiplexers to any one of the demultiplexing means.

The signal from each transmitter station is converted into an optical signal forming part of one of the optical multiplexers coupled to the optical switch means. Because the switch means can optically couple any of the multiplexers to the demultiplexer associated with a chosen receiver station, any transmitter station can be switched to any receiver station. Thus, if, for example, 400 transmitters were to be connected to 400 receivers the respective optical signals could be multiplexed into groups of twenty thereby forming a non-blocking network with reduced complexity to a similar network relying solely on multiplexing all the optical signals onto one by employing a 400 by 400 optical switch.

Any multiplexing method producing an optical multiplex may be used with the network of the present invention. Preferably wavelength multiplexing is used as this technique provides the greatest scope for wideband communication to which optical networks are of particular use. In this case each multiplexing means may include a plurality of optical sources for providing optical power at two or more wavelengths, a plurality of modulators each optically coupled to one of the optical sources and responsive to a signal from a transmitter station to provide an optical signal representative of that signal, and a plurality optical combiners for combining the optical signals to form the optical multiplexing.

Generally, more than one transmitter station signal will modulate an optical carrier of a given wavelength. A separate optical source may be provided for each such modulator or, alternatively, each optical source may provide optical power for more than one modulator. Conveniently every modulator operating at a given wavelength is supplied optical power by a single optical source.

Conveniently all the modulators of the network coupled to an optical source of a given wavelength are housed in a respective distinct unit. Such a unit may have one optical input, for example an optical fibre, for connection to an optical source with an internal optical splitter for splitting the optical power from the optical source to each modulator in the unit. With such an arrangement, an optical network according to the invention can be expanded to accomodate extra transmitters in stages of one unit by providing an additional optical source operating at a wavelength different from the others and coupling the extra unit's modulator outputs to the existing multiplexers.

Another convenient arrangement is to house all the optical modulators of the network whose optical outputs form part of the same multiplexer in a respective, distinct unit. In this case the multiplexing means may conveniently include an optical coupler within the housing having an output for connection to the switching means, the modulators each being connected to an optical source of a different wavelength. Such an optical network can also be conveniently expanded in stages to accommodate extra transmitters by optically coupling the additional modulators to the respective optical sources and optically connecting the additional multiplexer output to the switching means.

If desired, units of different size can be provided in either of the above schemes to provide more flexible growth stages.

The control means will have to be modified on expansion of the network to permit the new interconnections. The switching means may be provided with sufficient optical waveguides for anticipated expansion which could then be achieved readily by splicing each new modulator group to an unused waveguide.

If the size of the network is known beforehand the number of multiplexers and the number of optical signals per multiplexers can be designed to optimise costs by having regard to the relative costs of providing larger and smaller multiplexers and switching means.

The switching means may comprise a parallel bus of optical fibres optically coupled to the multiplexers, each carrying one optical multiplexed signal to a single respective optical space switch, each demultiplexer of the network being connected to one output of every optical switch. That is, each optical space switch is arranged to connect the respective multiplexer to any number of the demultiplexers to which it is connected.

Alternatively, the switch means may have a plurality of optical space switches each having a plurality of inputs equal in number to the number of multiplexers. In this case each multiplexer is optically coupled to an input of every optical space switch, and every demultiplexer is coupled to one output of just one of the optical space switches.

The demultiplexer must be able to extract the required transmitter signal from the multiplexed signal for forward transmission to the corresponding receiver station. In the case of time domain multiplexing this can be achieved by optical demultiplexing methods before the optical signals impinge on an optical detector or by electronic demultiplexing after optical detection. In the case of wavelength multiplexing a tunable optical filter can be used to select the required optical signal from the multiplexed signal.

Where a particular application of the present invention has the optical detectors of the demultiplexers sufficiently close to the optical modulators of the multiplexers, a coherent optical detector may be used employing homodyne or heterodyne detection. There may then be provided a selection means optically coupled to the sources of optical power which is responsive to a selection signal from the control means to connect an optical source with a selected output from an optical space switch. For homodyne detection the optical sources are combined unshifted in wavelength. For heterodyne detection the optical sources are combined with a selected output from the switch means after being frequency shifted a predetermined amount.

It is anticipated that an optical communication network according to the present invention providing interconnections between up to 10,000 transmitter and 10,000 receiver stations can be realised with present technology whilst having a structure of design which allows efficient and economic growth to be achieved in relatively small, incremental steps. When a network utilises wavelength multiplexing, the bandwidth for each multiplexer is limited only by the optoelectronic interface and therefore transmission at G bit rates is expected to be possible.

It will be appreciated by those working in the field of the invention that the control means required for the network can be particularly simple and that the present invention is applicable to both highly centralised and partially distributed control schemes and is not dependent on its operation on the actual control scheme or method employed. It is envisaged that the control means will be electronic and computer controlled but optical control means may be a possibility for future systems.

The present invention is applicable to switched networks other than for use for telecommunications applications. It may be used in interconnecting devices on a multiple processor, shared memory computers or other parallel processing schemes, for example.

Where a large number of multiplexes are employed it may be necessary to use in-line broadband laser amplifiers within the switching means to amplify the multiplexes due to splitting losses involved in optically splitting each multiplex to several optical space switches.

BRIEF DESCRIPTION OF THE DRAWINGS

Embodiments of the present invention will now be described by way of example only with reference to the accompanying drawings in which.

DETAILED DESCRIPTION OF THE DRAWINGS

Figure 1:
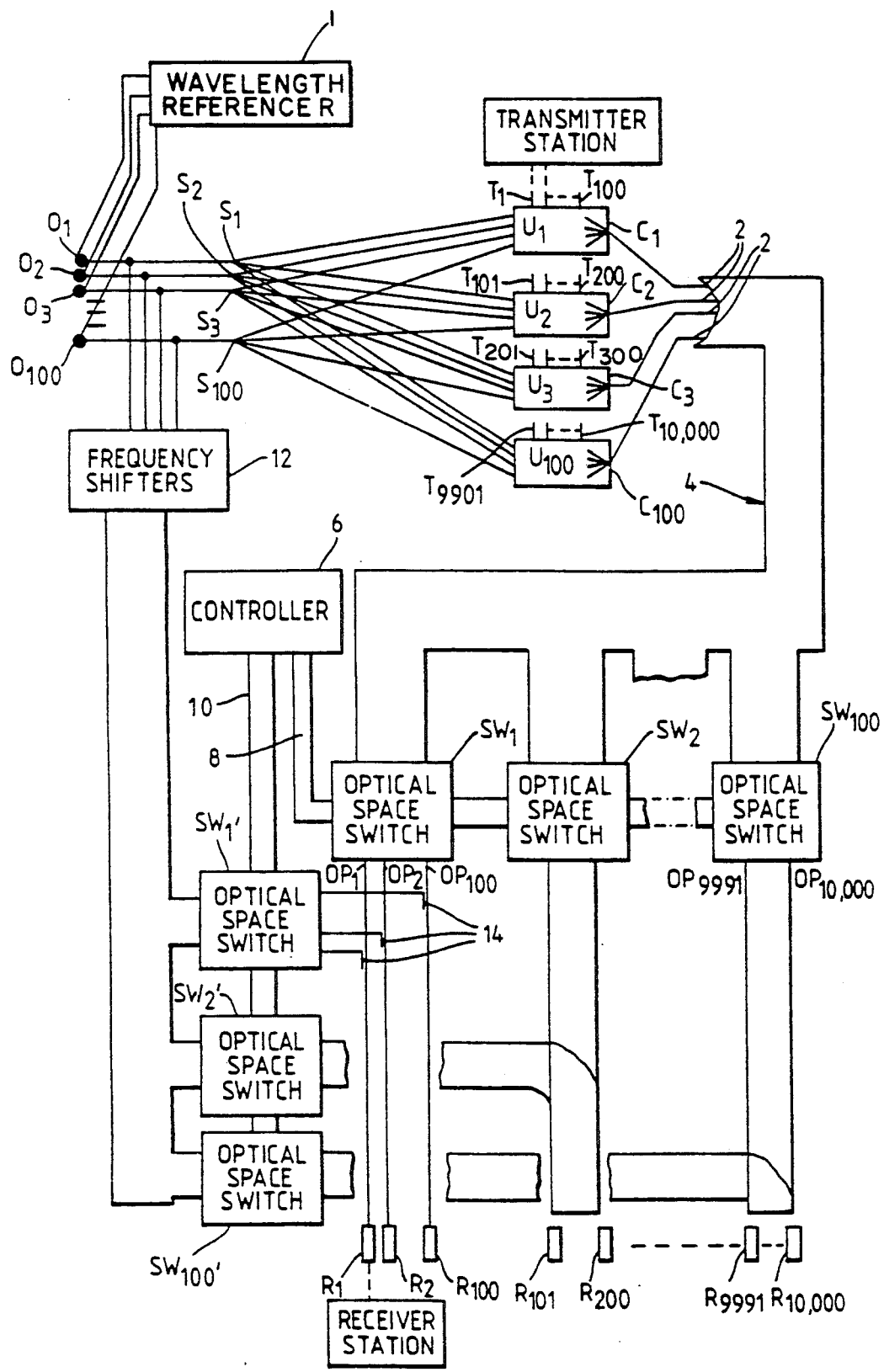
FIG. 1 is a schematic diagram of a switched optical network employing wavelength modulation.
Figure 2:
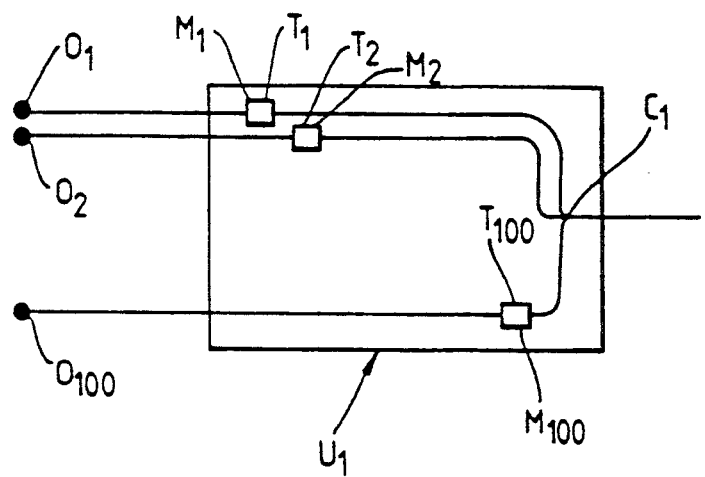
FIG. 2 is a schematic diagram of one unit of optical modulators of the network of FIG. 1.

Referring to FIGS. 1 and 2, a switched optical network has one hundred units $U_1$ to $U_{100}$ (only four shown for clarity) each housing one hundred of ten thousand optical modulators $M_1$ to $M_{10,000}$ (see FIG. 2) each of which is electrically connectable to a distinct transmitter station (one shown) via one of electrical connections $T_1$ to $T_{10,000}$ (only three per unit shown for clarity). The transmitter stations may be sources telephone or television signals for example. Each modulator M of a given unit is optically coupled to one of optical sources $O_1$ to $O_{100}$ each emitting a distinct wavelength ($\lambda_1$ to $\lambda_{100}$) (only four shown for clarity). The optical outputs from the modulators M within each unit U are combined by means of optical couplers $C_1$ to $C_{100}$, respectively, to form one hundred optical wavelength multiplexed signals each optically coupled into one of optical fibres 2 which are conveniently represented as an optical data bus 4. The optical sources O, modulators M and optical couplers C are elements of the multiplexing means of the network.

In the arrangement of FIG. 1, the optical power for every modulator M operating at a given frequency is provided by one corresponding optical source O whose output is split 100 ways by a corresponding one of the optical splitter $S_1$ to $S_{100}$, one of the splitter outputs being optically coupled to one modulator M on each unit U.

The optical sources O may, for example, be laser diodes or other sources of coherent optical radiation. In the arrangement of FIG. 1 it may be necessary to use a central referencing system 1 to maintain the required wavelength separation. A range of techniques have been proposed to achieve this in a paper entitled "Evolutionary wavelength division multiplexed schemes for broadband networks", by G. R. Hill, D. W. Smith, R. A. Lobbett, T. G. Hodgkinson and R. P. Webb, OFC 87, Reno 1987. If the optical power required by the modulators is more than one optical source can provide, two or more optical sources can be provided at each wavelength with a corresponding lower optical split and with each optical source providing optical power to a subset of the units U. A smaller network will require fewer wavelengths in which case it may be possible to dispense with a referencing system, and lasers would be chosen which are separated in wavelength by several nm and operated with individual wavelength stabilisation. Other optical sources may be useable, e.g. light emitting diodes with suitable optical filtering.

The modulators may be phase, frequency or amplitude modulators which in practice may be for example lithium niobate modulators. The modulators are grouped in units for convenience which in practice may incorporate any number of modulators. If the number of modulators per unit is less than the number of available frequencies, two or more units will have their outputs combined to form a complete multiplexer. The number of distinct frequencies determines the maximum number of channels on each multiplexer.

The multiplexed signals from the multiplexing means are each coupled via the optical fibres 2 to optical space switches $SW_1$ to $SW_{100}$ (only three shown for clarity) each having one hundred inputs (not shown). One input of each switch SW is optically coupled to one multiplexer. Each switch SW has one hundred outputs to provide in total outputs OP to $OP_{10,000}$ (only three shown for $SW_1$ for clarity), each output OP being connected to a respective heterodyne receiver $R_1$ to $R_{10,000}$, constituting the demultiplexing means, of an associated receiver station.

A controller 6 monitors requests for connections and supplies switch signals on a switch bus 8 and selection signals on a selection bus 10.

The optical space switches are configured to be able to switch any input to any one or more outputs OP simultaneously in response to switch signals received from the controller 6 via the switch bus 8. Thus a signal from any transmitter station can be switched to any receiver station by controlling the appropriate optical space switch to switch the multiplexer containing the corresponding optical signal from the modulator M corresponding to that transmitter station to the desired demultiplexer of a receiver station and selecting the appropriate signal from that multiplexer in response to the selection signal from the controller 6.

Suitable optical space switches are LCD type devices, combinations of optical and mechanical switches and D fibre devices or Lithium niobate planar waveguide switches, for example where configurable in a broadcast (i.e. one to many) arrangement.

In the arrangement of FIG. 1, the receiver stations are associated with heterodyne optical receivers R. The desired channel from the multiplexer switched to the receiver R is obtained by combining the multiplexed signal with optical power derived from that one of frequency shifters 12 coupled to the optical sources O which in turn is coupled to the modulator M of the transmitter station to be received. The frequency shifted optical power is switched by means of optical space switches $SW^1$ to one of optical couplers 14 (three shown). The frequency shifters may be acoustic-optic devices or electrooptic devices whose operation are based on the serodyne approach for example.

If homodyne receivers are used the frequency shifters would be omitted.

Alternatively filters located in front of the optical detector of the demultiplexer tunable under the control of the controller 6 could be used to select the required channel from the multiplexer.

Figure 6:
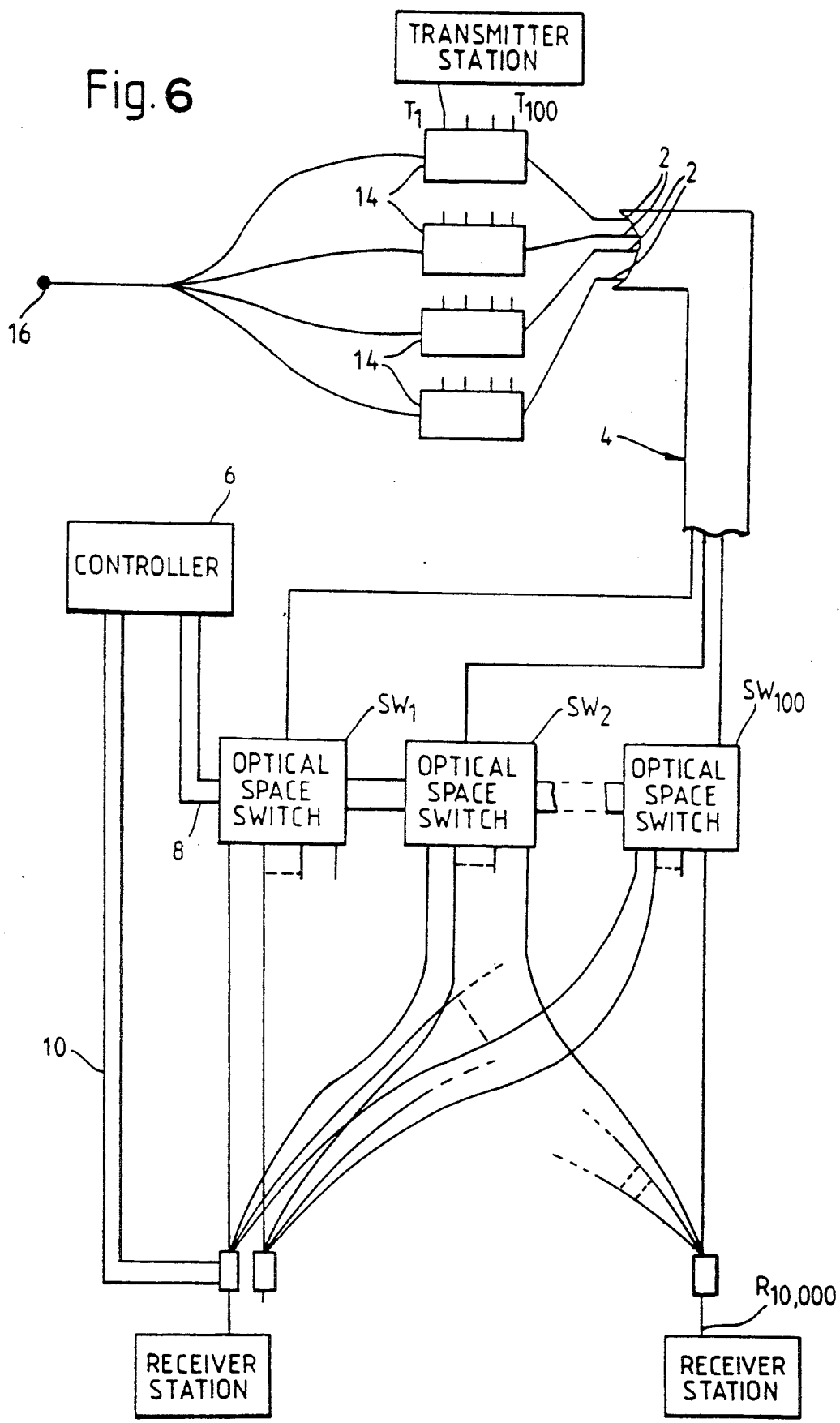
FIG. 6 is a schematic diagram of an alternative arrangement of an optical network wherein any multiplex may be switched to any receiver.

Other arrangements of optical space switches such as is shown in FIG. 6 can be employed to allow any to be switched to any receiver. For example optical multiplex space switches could be used which have one input for connection to a respective multiplexer and have many outputs, with one output coupled to each demultiplexer. This may have application for smaller networks where the simplicity of the switch architecture may offset the necessity to provide multiple coupling to each demultiplexer.

The hetero/homodyne detection methods discussed above have particular applicability to networks where the multiplexers and demultiplexers are located closely together, for example in connecting components of a computer system.

Figure 3:
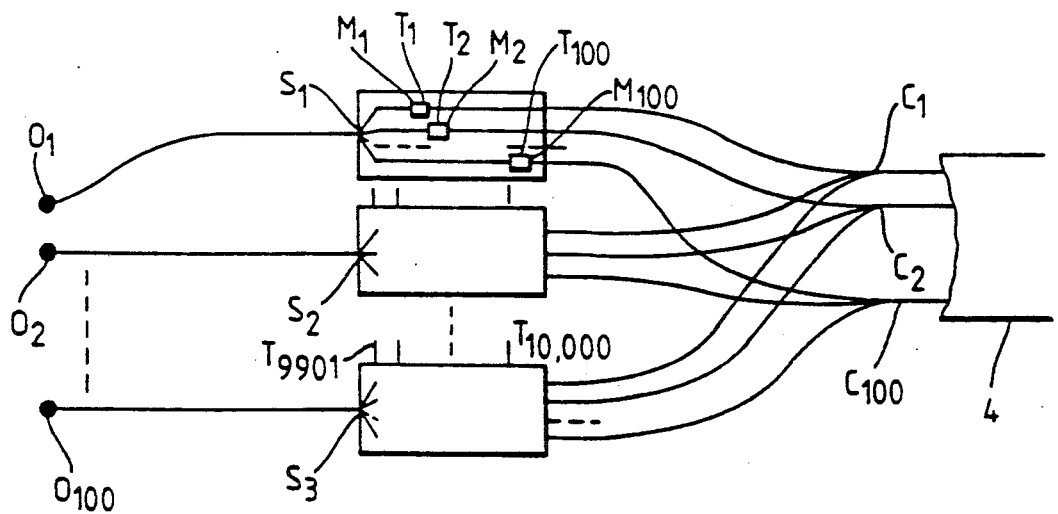
FIG. 3 is a schematic diagram of an alternative grouping of modulators for the network of FIG. 1.

Referring now to FIG. 3 an alternative grouping of modulators M in units to that shown in FIG. 1 is shown. All those modulators M of the network coupled to an optical source O of a given wavelength are housed in a distinct unit, the multiplexers being formed by combining one output of each modulator with one output from each of the other units. When the network has the same number of optical space switches as multiplexers (as in the FIG. 1 embodiment), the optical combiners may conveniently be formed by star couplers with each output of each star coupler being optically coupled to a different one of the optical space switches SW.

Figure 4:
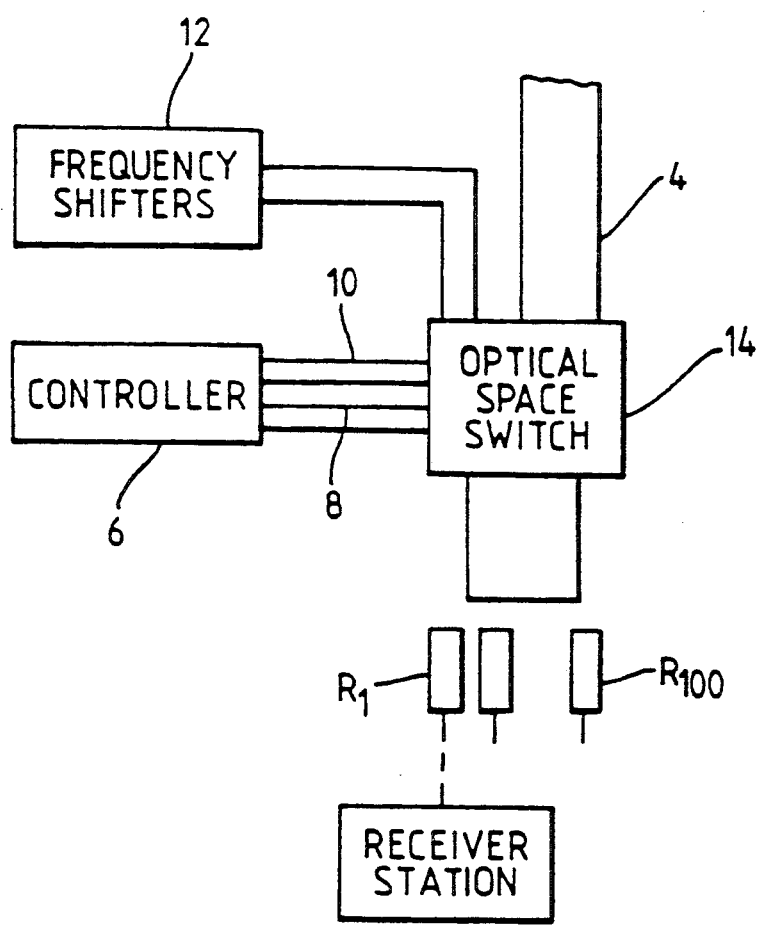
FIG. 4 is a schematic diagram of a combined optical space switch applicable to coherent receivers.

Referring now to FIG. 4, an optical space switch 14 is shown which combines the action of the combination of switches $SW_1$ and $SW_1'$ of FIG. 1 to switch both a frequency shifted optical source and a multiplexer to a chosen coherent receiver in response to signals from the controller 6.

Figure 5:
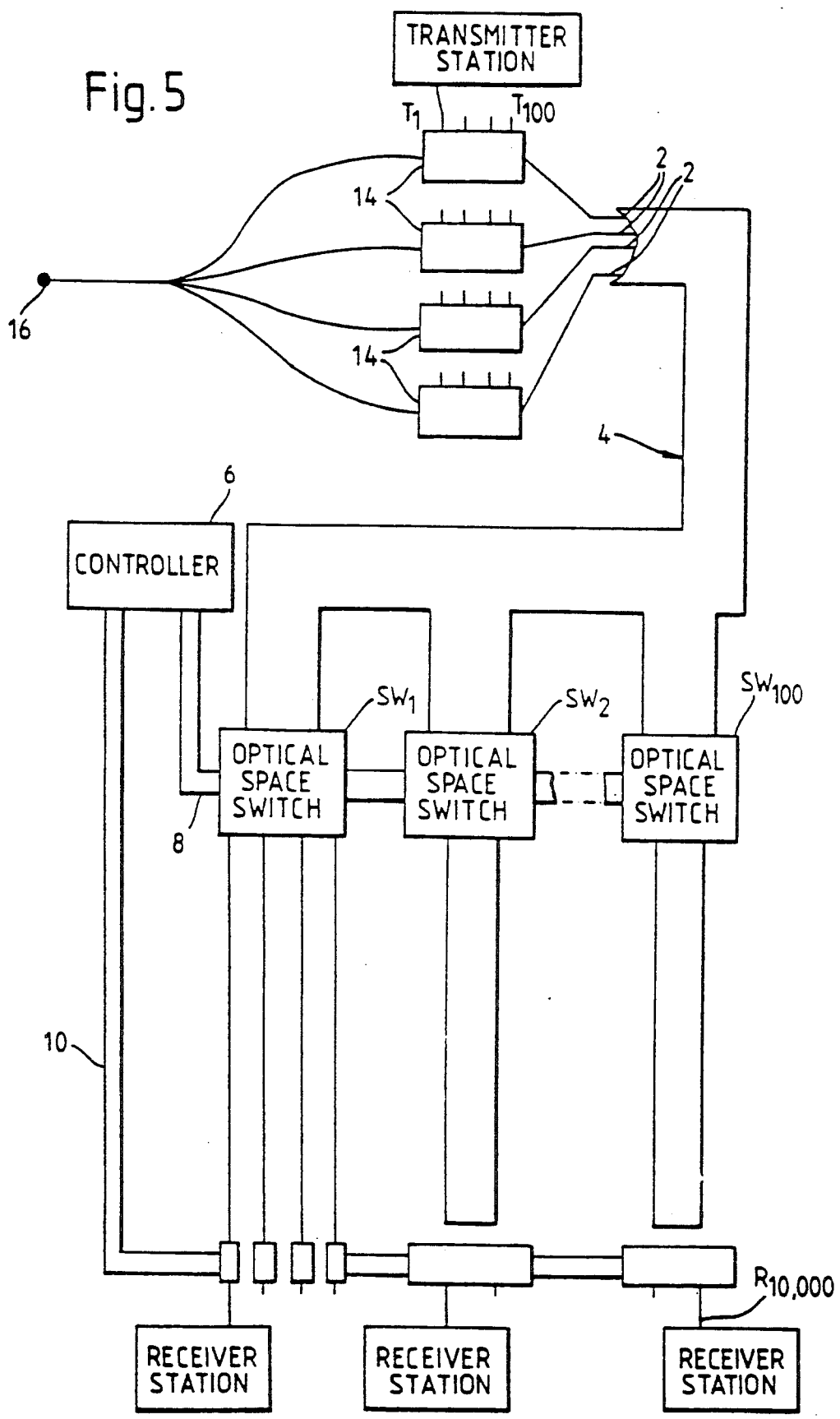
FIG. 5 is a schematic diagram of an optical network using non-wavelength multiplexing.

Referring now to FIG. 5, a switched optical network is shown suitable for use with multiplexing methods other than wavelength multiplexing. In this instance the controller 6.

Referring now to FIG. 5, a switched optical network is shown suitable for use with multiplexing methods other than wavelength multiplexing. In this instance the controller 6 directs the required multiplex to the required demultiplexer in the same way as described earlier by controlling the appropriate optical space switch SW. The controller 6 sends the selection signals to the appropriate demultiplexer via bus 10 to specify which of the multiplexed channels is to be demultiplexed for onward transmission to the corresponding receiver receiver station. The signals from groups of transmitters may utilise pulse position coding to form the multiplexer, for example.

Alternatively, it may be possible to achieve demultiplexing of the required channel by optical means prior to applying any optical signal to an optical detector of the receiver, in which case the controller 6 will send selection signals to the appropriate optical demultiplexer.

In the embodiment of FIG. 5, the multiplexed signals are formed by multiplexing signals from transmitter stations in the electrical domain to form an electrical multiplexer which electrical multiplexer is applied to an optical modulator to form the corresponding optical multiplexer by multiplexers 14. Only one wavelength of optical power 16 is required but several sources may be provided if necessary.

When only one transmitter station associated with a particular multiplexer is transmitting it will be understood that the corresponding signal can be regarded as being multiplexed with null signals from the other stations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A switched optical network for connecting signals from any one of a plurality of transmitter stations with any one of a plurality of receiver stations comprising:
   at least two optical multiplexing means each responsive to signals from two or more transmitter stations to provide optically multiplexed channels corresponding to the transmitter station signals;
   a plurality of optical demultiplexing means each associated with a respective receiver and each responsive to an optical multiplexer for selecting any one of the channels comprising the optical multiplexing means for reception at the receiver and responsive to a selection signal to output one transmitter station signal to the corresponding respective receiver station; and
   an optical switch means responsive to switch signals to optically couple any one of the optically multiplexed channels to any one of the demultiplexing means.

2. A network as claimed in claim 1 in which each multiplexing means includes a plurality of optical sources for providing power at two or more wavelengths, a plurality of modulators, each modulator being optically coupled to one of the optical sources and being responsive to the signals from a transmitter station to provide an optical signal representative of that transmitter station signal, and a plurality of optical combiners for combining the optical signals to form the optical multiplexer.

3. A network as claimed in claim 2 in which there is only one optical source of optical power at each wavelength.

4. A network as claimed in claim 2 in which the wavelengths of the optical sources are fixed by a central wavelength referencing means.

5. A network as claimed in claim 2 in which the optical sources are lasers.

6. A network as claimed in claim 2 including a plurality of distinct units for housing the modulators and in which each modulator of the network which is coupled to an optical source of a given wavelength is housed in the same unit.

7. A network as claimed in claim 6 in which the number of modulators in each unit is equal to the number of optically multiplexed channels.

8. A network as claimed in claim 2 including a plurality of distinct units for housing the modulators and in which all the modulators of the network whose optical outputs form part of the same multiplexer are housed in the same unit.

9. A network as claimed in claim 8 in which the number of units is equal to the number of distinct wavelengths from the optical sources.

10. A network as claimed in claim 8 in which the modulators of each unit are formed on a single lithium niobate substrate.

11. A network as claimed in claim 1 in which the optical switch means includes a plurality of optical space switches, each having one input optically coupled to a respective multiplexing means, and a plurality of outputs, each demultiplexer being optically coupled to one output of every optical space switch.

12. A network as claimed in claim 1 in which the optical switch means includes a plurality of optical space switches, each having a plurality of inputs, each multiplexing means being optically coupled to an input of every optical space switch, and each having a plurality of outputs, each demultiplexer being optically coupled to a distinct output of an optical space switch.

13. A network as claimed in claim 12 in which the number of outputs of each optical space switch equals the number of multiplexed channels.

14. A network as claimed in claim 13 in which each optical multiplexing means is a star coupler having a plurality of outputs, each output being optically coupled to an input of a distinct optical space switch.

15. A network as claimed in claim 2 in which each demultiplexer is also coupleable to any one of said optical sources by a selection means responsive to the selection signal.

16. A network as claimed in claim 15, in which the selection means comprises a plurality of secondary optical space switches equal in number to the number of optical space switches, each having a plurality of inputs equal in number to the number of distinct wavelengths of the optical sources and each input being connected to an optical source of distinct wavelength, and each having a plurality of outputs equal in number to the number of optical space switches, each output of a given secondary optical space switch being combined with a distinct output of one corresponding optical space switch.

17. A network as claimed in claim 16 in which each secondary optical space switch forms part of the corresponding optical space switch, each output of the optical space switch being optically coupleable simultaneously to one of the inputs connected to a multiplexer and to one of the inputs connected to an optical source.

18. A network as claimed in claim 15 for use with a heterodyne receiver, in which the selection means includes a frequency shift means whereby each optical source is frequency shifted by a predetermined amount prior to being coupled with the output of an optical space switch.

19. A network as claimed in claim 2 in which each receiver station includes an optical detector and a tunable filter, the tunable filter being responsive to a said selection signal to permit only one wavelength of an optical multiplexer coupled to the receiver station to reach the optical detector.

20. A switched optical network for connecting signals from any one of a plurality of transmitter stations with any one of a plurality of receiver stations comprising:
at least two optical multiplexing means each responsive to signal from two or more transmitter stations to provide optically multiplexed signals corresponding to the transmitter station signals;
a plurality of optical demultiplexing means each associated with a respective receiver and each responsive to an optical multiplexer and a selection signal to output one transmitter station signal to the corresponding respective receiver station;
an optical switch means responsive to switch signals to optically couple any one of the optically multiplexed signals to any one of the demultiplexing means,
wherein said optical switch means includes a plurality of optical space switches, each having one input optically coupled to a respective multiplexing means, and a plurality of outputs, each demultiplexer being optically coupled to one output of every optical space switch.

21. A network as claimed in claim 20 in which each multiplexing means includes a plurality of optical sources for providing power at two or more wavelengths, a plurality of modulators, each modulator being optically coupled to one of the optical sources and being responsive to the signals from a transmitter station to provide an optical signal representative of that transmitter station signal, and a plurality of optical combiners for combining the optical signals to form the optical multiplexer.

22. A network as claimed in claim 21 in which each demultiplexer is also coupleable to any one of said optical sources by a selection means responsive to the selection signal.

23. A network as claimed in claim 22 in which the selection means comprises a plurality of secondary optical space switches equal in number to the number of optical space switches, each having a plurality of inputs equal in number to the number of distinct wavelengths of the optical sources and each input being connected to an optical source of distinct wavelength, and each having a plurality of outputs equal in number to the number of optical space switches, each output of a given secondary optical space switch being combined with a distinct output of one corresponding optical space switch.

24. A network as claimed in claim 23 in which each secondary optical space switch forms part of the corresponding optical space switch, each output of the optical space switch being optically coupleable simultaneously to one of the inputs connected to a multiplexer and to one of the inputs connected to an optical source.

25. A network as claimed in claim 22 for use with a heterodyne receiver, in which the selection means includes a frequency shift means whereby each optical source is frequency shifted by a predetermined amount prior to being coupled with the output of an optical space switch.

26. A network as claimed in claim 20 in which each receiver station includes an optical detector and a tunable filter, the tunable filter being responsive to said selection signal to permit only one wavelength of the optically multiplexed signals coupled to the receiver station to reach the optical detector.

27. A network as claimed in claim 21 in which there is only one optical source of optical power at each wavelength.

28. A network as claimed in claim 21 in which the wavelengths of the optical sources are fixed by a central wavelength referencing means.

29. A network as claimed in claim 21 in which the optical sources are lasers.

30. A network as claimed in claim 21 including a plurality of distinct units for housing the modulators and in which each modulator of the network which is coupled to an optical source of a given wavelength is housed in the same unit.

31. A network as claimed in claim 30 in which the number of modulators in each unit is equal to the number of optically multiplexed signals.

32. A network as claimed in claim 21 including a plurality of distinct units for housing the modulators and in which all the modulators of the network whose optical outputs form part of the same multiplexer are housed in the same unit.

33. A network as claimed in claim 32 in which the number of units is equal to the number of distinct wavelengths from the optical sources.

34. A switched optical network for connecting signals from any one of a plurality of transmitter stations with any one of a plurality of receiver stations comprising:
at least two optical multiplexing means each responsive to signals from two or more transmitter stations to provide optically multiplexed signals corresponding to the transmitter station signals;
a plurality of optical demultiplexing means each associated with a respective receiver and each responsive to an optically multiplexed signal and a selection signal to output one transmitter station signal to the corresponding respective receiver station;
an optical switch means responsive to switch signals to optically couple any one of the optically multiplexed signals to any one of the demultiplexing means,
wherein said optical switch means includes a plurality of optical space switches, each having a plurality of inputs, each multiplexing means being optically coupled to an input of every optical space switch, and each having a plurality of outputs, each demultiplexer being optically coupled to a distinct output of an optical space switch.

35. A network as claimed in claim 34 in which the number of outputs of each optical space switch equals the number of optically multiplexed signals.

36. A network as claimed in claim 35 in which each optical multiplexing means is a star coupler having a plurality of outputs, each output being optically coupled to an input of a distinct optical space switch.

37. A network as claimed in claim 34 in which each multiplexing means includes a plurality of optical sources for providing power at two or more wavelengths, a plurality of modulators, each modulator being optically coupled to one of the optical sources and being responsive to the signals from a transmitter station to provide an optical signal representative of that transmitter station signal, and a plurality of optical combiners for combining the optical signals to form the optical multiplexer.

38. A network as claimed in claim 37 in which each demultiplexer is also coupleable to any one of said optical sources by a selection means responsive to the selection signal.

39. A network as claimed in claim 38 in which the selection means comprises a plurality of secondary optical space switches equal in number to the number of optical space switches, each having a plurality of inputs equal in number to the number of distinct wavelengths of the optical sources and each input being connected to an optical source of distinct wavelength, and each having a plurality of outputs equal in number to the number of optical space switches, each output of a given secondary optical space switch being combined with a distinct output of one corresponding optical space switch.

40. A network as claimed in claim 39 in which each secondary optical space switch forms part of the corresponding optical space switch, each output of the optical space switch being optically coupleable simultaneously to one of the inputs connected to a multiplexer and to one of the inputs connected to an optical source.

41. A network as claimed in claim 38 for use with a heterodyne receiver, in which the selection means includes a frequency shift means whereby each optical source is frequency shifted by a predetermined amount prior to being coupled with the output of an optical space switch.

42. A network as claimed in claim 37 in which each receiver station includes an optical detector and a tunable filter, the tunable filter being responsive to said selection signal to permit only one wavelength of an optical multiplexer coupled to the receiver station to reach the optical detector.

43. A network as claimed in claim 37 in which there is only one optical source of optical power at each wavelength.

44. A network as claimed in claim 37 in which the wavelengths of the optical sources are fixed by a central wavelength referencing means.

45. A network as claimed in claim 37 in which the optical sources are lasers.

46. A network as claimed in claim 37 including a plurality of distinct units for housing the modulators and in which each modulator of the network which is coupled to an optical source of a given wavelength is housed in the same unit.

47. A network as claimed in claim 46 in which the number of modulators in each unit is equal to the number of optically multiplexed signals.

48. A network as claimed in claim 37 including a plurality of distinct units for housing the modulators and in which all the modulators of the network whose optical outputs form part of the same multiplexer are housed in the same unit.

49. A network as claimed in claim 48 in which the number of units is equal to the number of distinct wavelengths from the optical sources.

50. A switched optical network for connecting signals from any one of a plurality of transmitter stations with any one of a plurality of receiver stations comprising:

at least two optical multiplexing means each responsive to signals from two or more transmitter stations to provide optically multiplexed signals corresponding to the transmitter station signals;

a plurality of optical demultiplexing means each associated with a respective receiver and each responsive to an optically multiplexed signal and a selection signal to output one transmitter station signal to the corresponding respective receiver station;

an optical switch means responsive to switch signals to optically couple any one of the optically multiplexed signals to any one of the demultiplexing means;

each said multiplexing means includes a plurality of optical sources for providing power at two or more wavelengths, a plurality of modulators, each modulator being optically coupled to one of the optical sources and being responsive to the signals from a transmitter station to provide an optical signal representative of that transmitter station signal, and a plurality of optical combiners for combining the optical signals to form the optically multiplexed signals;

a plurality of distinct units for housing said modulators such that all the modulators of the network whose optical outputs form part of the same multiplexer are housed in the same unit, wherein the number of units is equal to the number of distinct wavelengths from the optical sources; and the modulators of each unit are formed on a single lithium niobate substrate.

* * * * *

UNITED STATES PATENT AND TRADEMARK OFFICE
CERTIFICATE OF CORRECTION

PATENT NO. : 5,144,465
DATED     : September 1, 1992
INVENTOR(S) : David W. Smith It is certified that error appears in the above-identified patent and that said Letters Patent is hereby corrected as shown below:

Column 7, line 40, delete "optical multiplexer" and insert -- optically multiplexed signal --;
  lines 41 and 42, delete "comprising the optical multiplexing means" and insert -- from the optically multiplexed channels --.
Column 9, line 12, delete "signal" and insert -- signals --;
  line 17, delete "optical multiplexer" and insert -- optical multiplexed signal --.

Signed and Sealed this

Eighth Day of March, 1994

*Attest:*

BRUCE LEHMAN

*Attesting Officer*   Commissioner of Patents and Trademarks